US010749660B2

(12) United States Patent
Liu et al.

(10) Patent No.: US 10,749,660 B2
(45) Date of Patent: Aug. 18, 2020

(54) SYSTEM AND METHOD FOR FULL DUPLEX LINK ADAPTATION IN A FULL DUPLEX COMMUNICATIONS SYSTEM

(71) Applicant: Futurewei Technologies, Inc., Plano, TX (US)

(72) Inventors: Bin Liu, San Diego, CA (US); Richard Stirling-Gallacher, San Diego, CA (US); Jian Wang, Pittsburgh, PA (US); Lili Zhang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 112 days.

(21) Appl. No.: 15/897,576

(22) Filed: Feb. 15, 2018

(65) Prior Publication Data

US 2018/0175997 A1   Jun. 21, 2018

Related U.S. Application Data

(63) Continuation of application No. 14/818,030, filed on Aug. 4, 2015, now Pat. No. 9,929,852.

(51) Int. Cl.
*H04L 5/14* (2006.01)
*H04L 1/00* (2006.01)
(Continued)

(52) U.S. Cl.
CPC .............. *H04L 5/14* (2013.01); *H04L 1/0003* (2013.01); *H04L 1/0009* (2013.01);
(Continued)

(58) Field of Classification Search
CPC ....... H04L 5/14; H04L 1/0026; H04L 1/0003; H04W 52/04
See application file for complete search history.

(56) References Cited

U.S. PATENT DOCUMENTS 6,799,045 B1    9/2004  Brouwer
2002/0094834 A1  7/2002  Baker et al.
(Continued)

FOREIGN PATENT DOCUMENTS

CN    1855753 A    11/2006
CN    101411083 A   4/2009
(Continued)

OTHER PUBLICATIONS

Ahmed, E., et al., "Rate Gain Region and Design Tradeoffs for Full-Duplex Wireless Communications," Wireless Communications, IEEE Transactions, vol. 12, No. 7, Jul. 2013, pp. 3556-3565.
(Continued)

*Primary Examiner* — Jamal Javaid
(74) *Attorney, Agent, or Firm* — Slater Matsil, LLP

(57) ABSTRACT

A method for operating a communications controller adapted for full duplex (FD) operation includes receiving a measurement report from a user equipment served by the communications controller, the measurement report indicating a first power margin between a current transmit power and a transmit power break point and a second power margin between the current transmit power and a maximum transmit power capable of supporting FD operation, performing FD link adaptation (LA) in accordance with the first power margin and the second power margin to adjust one or more FD configuration parameters of a link between the communications controller and the user equipment, wherein the link includes a downlink and an uplink, and instructing the user equipment to communicate over the link in accordance with the one or more FD configuration parameters.

14 Claims, 15 Drawing Sheets

(51) Int. Cl.
*H04W 52/04* (2009.01)
*H04W 52/36* (2009.01)
*H04B 1/525* (2015.01)

(52) U.S. Cl.
CPC .......... *H04L 1/0026* (2013.01); *H04L 5/1461* (2013.01); *H04W 52/04* (2013.01); *H04W 52/367* (2013.01); *H04B 1/525* (2013.01)

(56) References Cited

U.S. PATENT DOCUMENTS

| | | |
|---|---|---|
| 2007/0178927 A1 | 8/2007 | Fernandez-Corbaton et al. |
| 2010/0091725 A1 | 4/2010 | Ishii |
| 2010/0091727 A1 | 4/2010 | Ishii |
| 2011/0158137 A1 | 6/2011 | Tam et al. |
| 2011/0222445 A1 | 9/2011 | Alanara |
| 2012/0069927 A1* | 3/2012 | Oyman ................ H04L 1/0019 375/285 |
| 2012/0198253 A1 | 8/2012 | Kato et al. |
| 2015/0223141 A1 | 8/2015 | Chatterjee et al. |
| 2015/0244505 A1 | 8/2015 | Celebi et al. |
| 2016/0020894 A1* | 1/2016 | Tetzlaff ................ H04L 5/1461 370/278 |
| 2016/0323830 A1 | 11/2016 | Kim et al. |
| 2016/0330011 A1 | 11/2016 | Lee et al. |

FOREIGN PATENT DOCUMENTS

| | | |
|---|---|---|
| CN | 101515815 A | 8/2009 |
| CN | 101669402 A | 3/2010 |
| CN | 102483644 A | 5/2012 |
| GB | 2499259 A | 8/2013 |
| WO | 2015094914 A1 | 6/2015 |
| WO | 2015099344 A1 | 7/2015 |

OTHER PUBLICATIONS

Duarte, M., et al., "Full-Duplex Wireless Communications Using Off-The-Shelf Radio: Feasibility and First Results," Signals, Systems, and Computers (ASILOMAR), 2010 Conference Record of the Forty Fourth Asilomar Conference, Nov. 7-10, 2010, pp. 1558-1562.

Jain, M., et al., "Practical, Real-time, Full Duplex Wireless," sing.stanford.edu/pubsimob/com11-duplex.pdf, downloaded Jul. 9, 2015, 12 pages.

Sabharwal, A., "In-Band Full-Duplex Wireless: Challenges and Opportunites," IEEE Journal on Selected Areas in Communications, vol. 32, No. 9, Sep. 2014, pp. 1637-1652.

Bharadia, et al., "Full Duplex Radios," SIGCOMM'13, Hong Kong, China, Aug. 12-16, 2013, pp. 375-386.

\* cited by examiner

SYSTEM AND METHOD FOR FULL DUPLEX LINK ADAPTATION IN A FULL DUPLEX COMMUNICATIONS SYSTEM

CROSS-REFERENCE TO RELATED APPLICATIONS

This application is a continuation of U.S. patent application Ser. No. 14/818,030, entitled "System and Method for Full Duplex Link Adaption in a Full Duplex Communications System," filed on Aug. 4, 2015, which application is hereby incorporated herein by reference.

TECHNICAL FIELD

The present disclosure relates generally to digital communications, and more particularly to a system and method for full duplex link adaptation in a full duplex communications system.

BACKGROUND

In a full duplex (FD) device, the device simultaneously transmits and receives in a single frequency band. In other words, uplink and downlink transmissions occur at the same time and in the same frequency band. Since an FD device does not have to wait until it is done transmitting in order to receive and vice versa as a half duplex device does, there is a potential to double spectrum efficiency.

SUMMARY

Example embodiments provide a system and method for full duplex link adaptation in a full duplex communications system.

In accordance with an example embodiment, a method for operating a communications controller adapted for full duplex (FD) operation is provided. The method includes receiving, by the communications controller, a measurement report from a user equipment served by the communications controller, the measurement report indicating a first power margin between a current transmit power and a transmit power break point and a second power margin between the current transmit power and a maximum transmit power capable of supporting FD operation, and performing, by the communications controller, FD link adaptation (LA) in accordance with the first power margin and the second power margin to adjust one or more FD configuration parameters of a link between the communications controller and the user equipment, wherein the link includes a downlink and an uplink. The method includes instructing, by the communications controller, the user equipment to communicate over the link in accordance with the one or more FD configuration parameters.

In accordance with another example embodiment, a method for operating a user equipment (UE) adapted for full duplex (FD) operation is provided. The method includes generating, by the UE, a measurement report indicating a first power margin between a current transmit power and a transmit power break point and a second power margin between the current transmit power and a maximum transmit power capable of supporting FD operation, sending, by the UE, the measurement report to a communications controller serving the UE, and receiving, by the UE, FD configuration parameters adapted in accordance with the first power margin and the second power margin. The method includes configuring, by the UE, at least one of a receiver and a transmitter in accordance with the FD configuration parameters, and communicating, by the UE, with the communications controller in accordance with the FD configuration parameters.

In accordance with another example embodiment, a communications controller adapted for full duplex (FD) operation is provided. The communications controller includes a processor, and a computer readable storage medium storing programming for execution by the processor. The programming including instructions to receive a measurement report from a user equipment served by the communications controller, the measurement report indicating a first power margin between a current transmit power and a transmit power break point and a second power margin between the current transmit power and a maximum transmit power capable of supporting FD operation, perform FD link adaptation (LA) in accordance with the first power margin and the second power margin to adjust one or more FD configuration parameters of a link between the communications controller and the user equipment, wherein the link includes a downlink and an uplink, and command the user equipment to communicate over the link in accordance with the one or more FD configuration parameters.

In accordance with another example embodiment, a user equipment (UE) adapted for full duplex (FD) operation is provided. The UE includes a processor, and a computer readable storage medium storing programming for execution by the processor. The programming including instructions to generate a measurement report indicating a first power margin between a current transmit power and a transmit power break point and a second power margin between the current transmit power and a maximum transmit power capable of supporting FD operation, send the measurement report to a communications controller serving the UE, receive FD configuration parameters adapted in accordance with the first power margin and the second power margin, configure at least one of a receiver and a transmitter in accordance with the FD configuration parameters, and communicate with the communications controller in accordance with the FD configuration parameters.

Practice of the foregoing embodiments improves spectral efficiency in full duplex communications systems by adapting links in the full duplex communications systems.

Moreover, fast and slow adaptation techniques are presented to enable rapid tracking and fine tracking capabilities to meet varying environmental conditions.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments disclosed herein, and do not limit the scope of the disclosure.

One embodiment relates to full duplex (FD) link adaptation in a FD communications system. For example, a communications controller receives a measurement report from a user equipment served by the communications controller, the measurement report indicating a first power margin between a current transmit power and a transmit power break point and a second power margin between the current transmit power and a maximum transmit power capable of supporting FD operation, performs FD link adaptation (LA) in accordance with the first power margin and the second power margin to adjust one or more FD configuration parameters of a link between the communications controller and the user equipment, wherein the link includes a downlink and an uplink, and instructs the user equipment to communicate over the link in accordance with the one or more FD configuration parameters.

The embodiments will be described with respect to example embodiments in a specific context, namely FD communications systems that use FD link adaptation to improve communications performance. The embodiments may be applied to standards compliant FD communications systems, such as those that are compliant with Third Generation Partnership Project (3GPP), IEEE 802.11, and the like, technical standards, and non-standards compliant communications systems, that use FD link adaptation to improve communications performance.

Link adaptation (LA) is the ability to adapt (adjust) a modulation and coding scheme (MCS) level and/or a transmit power level of a link. The adaptation may be made according to the quality of the link. As an example, when the quality of the link is high, a highly efficient MCS level with small error correction is used, while when the quality of the link is low, efficiency is traded off to obtain greater error correction capability.

Figure 1:
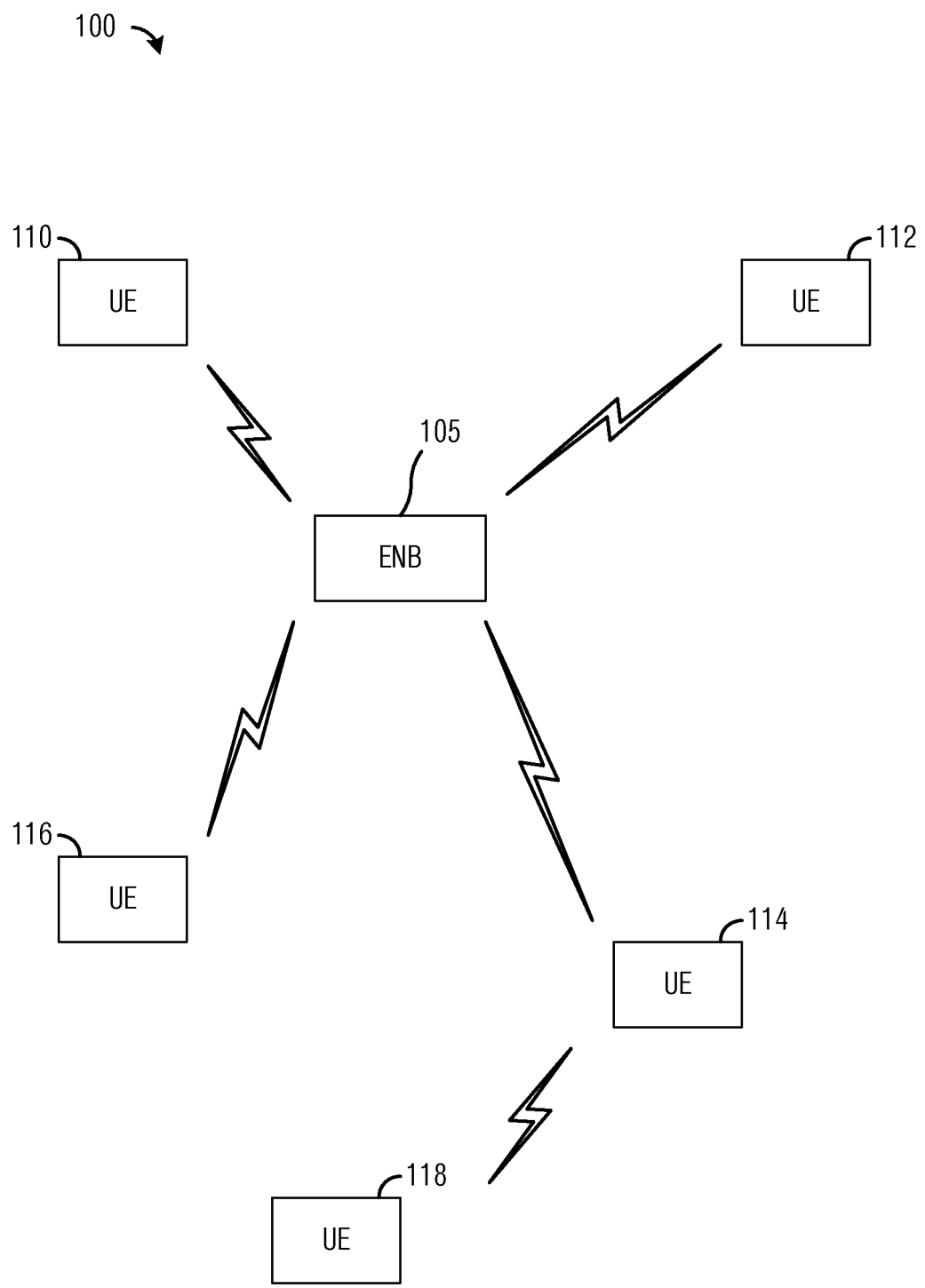
FIG. 1 illustrates an example communications system according to example embodiments described herein.

FIG. 1 illustrates an example communications system 100. Communications system 100 includes an evolved NodeB (eNB) 105 serving a plurality of user equipments (UE), such as UE 110, UE 112, UE 114, and UE 116. In a first common operating mode, communications to a UE or from UE must pass through eNB 105. In a second common operating mode, UEs can directly communicate with each other without having to go through eNB 105. A UE 118 is shown directly communicating with UE 114. eNB 105 may also be commonly referred to as a NodeB, a base station, an access point (AP), a base terminal station, and so on, while a UE may also be commonly referred to as a mobile station, a mobile, a terminal, a user, a subscriber, a station, and so forth.

While it is understood that communications systems may employ multiple eNBs capable of communicating with a number of UEs, only one eNB, and a number of UEs are illustrated for simplicity.

Figure 2:
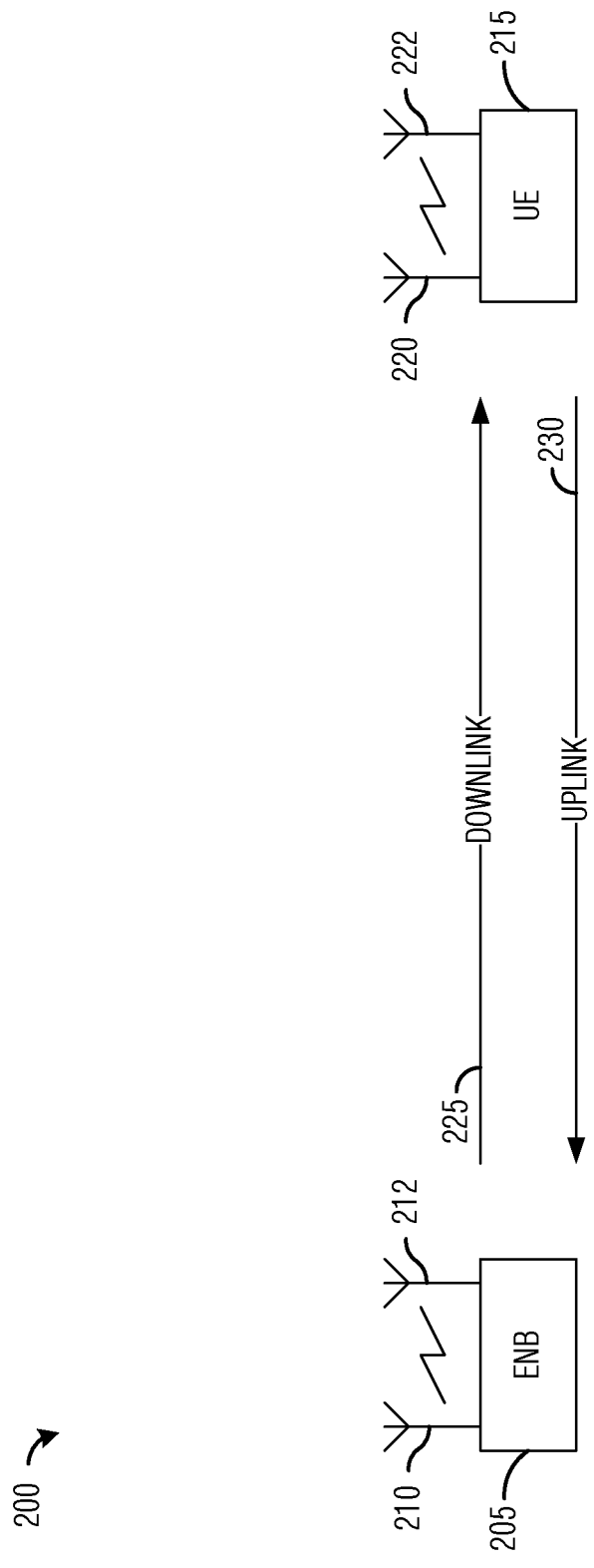
FIG. 2 illustrates an example FD communications system according to example embodiments described herein.

FIG. 2 illustrates an example FD communications system 200. FD communications system 200 includes an eNB 205 and a UE 215. eNB 205 includes one or more transmit antennas 210 and one or more receive antennas 212. UE 215 includes one or more transmit antennas 220 and one or more receive antennas 222. Both eNB 205 and UE 215 are capable of FD operation, where they simultaneously transmit and receive on a downlink 225 and an uplink 230 in a single frequency band. As an illustrative example, eNB 205 transmits on downlink 225 and receives on uplink 230 while UE 215 receives on downlink 225 and transmits on uplink 230. Both eNB 205 and UE 215 are also capable of half duplex (HD) operation, where the devices either transmit or receive on downlink 225 and uplink 230 in a single frequency band. As an illustrative example, eNB 205 transmits on downlink 225 (or receives on uplink 230) while UE 215 receives on downlink 225 (or transmits on uplink 230).

The FD uplink and the FD downlink are coupled together from the perspective of a UE. When a self-interference noise floor (the interference at a receiver (RX) of a UE due to transmissions at a transmitter (TX) of the UE) is lower than a RX noise floor (the minimum noise level at the RX of the UE, generally related to a noise figure of the RX and a bandwidth of the RX, as well as other environmental sources of interference (other than self-interference)), the signal to interference plus noise ratio (SINR) of the RX is dominated by the RX noise floor. Changes to the transmit power of the TX will usually not affect the RX SINR.

Figure 3:
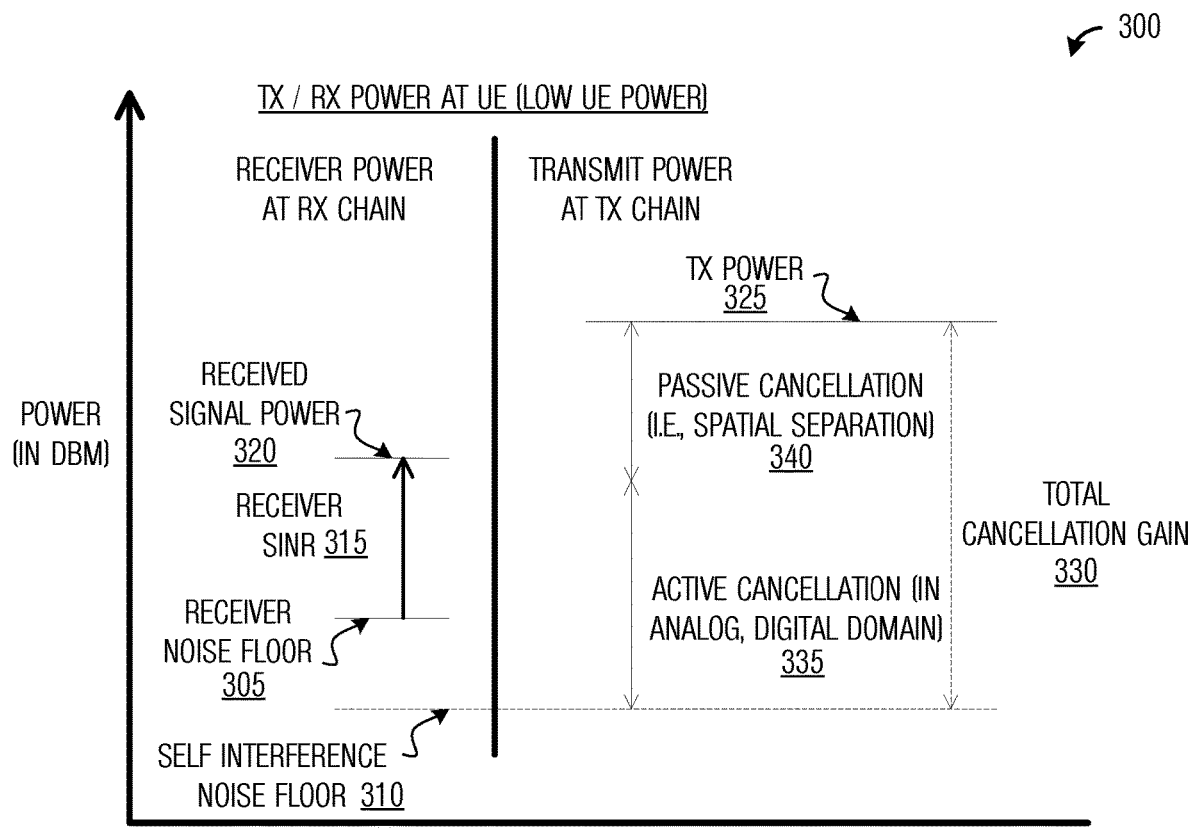
FIG. 3 illustrates a diagram of TX and RX power at a UE highlighting a RX SINR dominated by RX noise floor scenario according to example embodiments described herein.

FIG. 3 illustrates a diagram 300 of TX and RX power at a UE highlighting a RX SINR dominated by RX noise floor scenario. At a RX receive chain, a RX noise floor 305 is higher than a self-interference noise floor 310, which means that a RX SINR 315 is dependent upon a received signal power 320 and RX noise floor 305. At a RX transmit chain, a TX power level 325 corresponds to self-interference noise floor 310. TX power level 325 corresponds to a total cancellation gain 330, which includes components from active cancellation 335 (cancellation in analog and/or digital domains) and passive cancellation 340 (cancellation due to spatial separation, for example).

Figure 4:
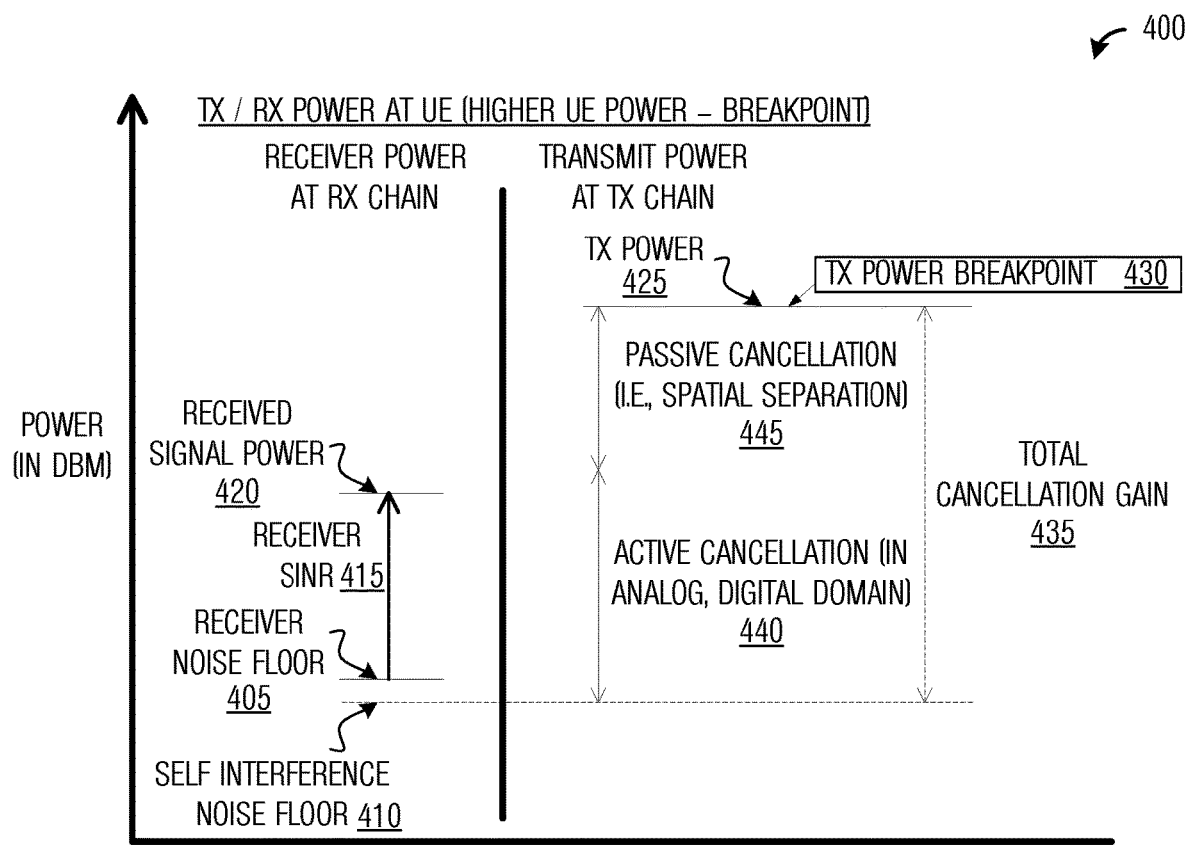
FIG. 4 illustrates a diagram of TX and RX power at a UE highlighting a RX SINR dominated by self-interference according to example embodiments described herein.

When the self-interference noise floor is approximately equal to (within a few dBs, generally 3 to 6 dBs) or greater than the RX noise floor, changes to the transmit power of the TX will affect the RX SINR. FIG. 4 illustrates a diagram 400 of TX and RX power at a UE highlighting a RX SINR on the verge of being affected by residual self-interference. At RX receive chain, a self-interference noise floor 410 is less than but within a few dBs of a RX noise floor 405. A RX SINR 415 is dependent upon a received signal power 420 and an effective RX noise floor, which includes RX noise floor 405 and self-interference noise floor 410. At a UE TX transmit chain, TX power level 425 is equal to a TX power breakpoint 430. TX power breakpoint 430 is defined as a transmit power level above which self-interference noise floor 410 will noticeably impact RX SINR. In other words, when TX power level 425 is less than TX power break point 430, self-interference noise floor 410 is significantly less than RX noise floor 405 and has no impact on RX SINR; when TX power level 425 is equal to TX power break point 430, self-interference noise floor 410 is close to RX noise floor 405 and begins to impact RX SINR; and when TX power level 425 is greater than TX power break point 430, self-interference noise floor 410 is approximately equal to (within a few dBs, generally 3 to 6 dBs) or greater than RX noise floor 405 and will substantially impact RX SINR. In other words, when TX power 425 exceeds TX power break point 430, the effective RX noise floor will be increased and negatively impact FD performance on the downlink. It is noted that if self-interference noise is equal to RX noise floor 405, there will be a 3 dB reduction in RX SINR 415 compared to a situation when the UE is self-interference noise free. If self-interference noise is 6 dB lower than RX noise floor 405, there will be about a 1 dB reduction in RX SINR 415.

The actual value of TX power break point 430 may be dependent on RX noise floor 405. Also shown in FIG. 4 is a total cancellation gain 435, which components from active cancellation 440 (cancellation in analog and/or digital domains) and passive cancellation 445 (cancellation due to spatial separation, for example).

Furthermore, when the TX power level of a UE exceeds a threshold needed to support a lowest modulation and coding scheme (MCS) level in the FD downlink, FD operation at the UE is not feasible. In other words, when the TX power level of a UE exceeds the threshold needed to support the lowest MCS level in the FD downlink, the resulting RX SINR is too low to support FD downlink operation.

The FD uplink and the FD downlink are pseudo-independent from the perspective of an eNB. The transmit power of an eNB is semi-static in nature and varies slowly according to cell load. At the eNB, FD operation is supported as long as the RX SINR is greater than a threshold (the threshold may be positive or negative). A required RX power level to support FD operation depends on the effective RX noise floor, which is, in turn, related to the TX power level of the eNB. Therefore, the required RX power is also semi-static and based on cell load.

Figure 5:
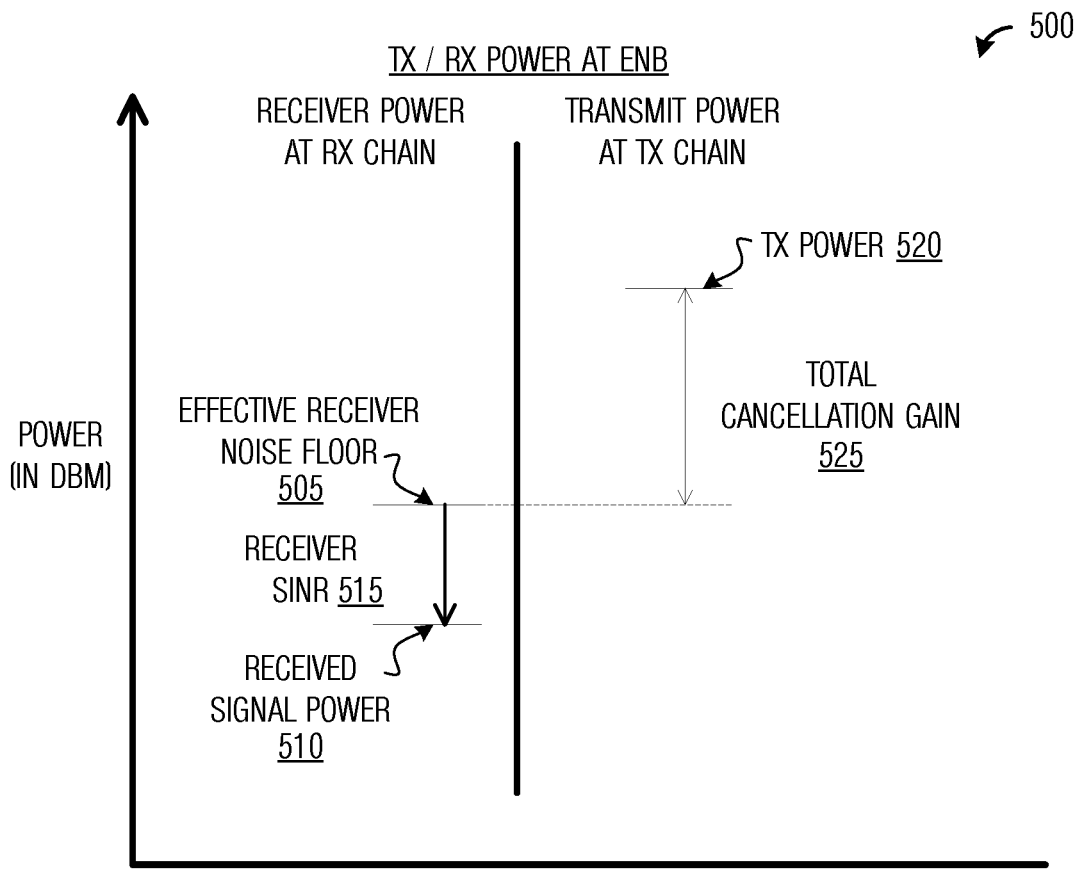
FIG. 5 illustrates a diagram of TX and RX power at an eNB according to example embodiments described herein.

FIG. 5 illustrates a diagram 500 of TX and RX power at an eNB. A RX receive chain has an effective RX noise floor 505 and a received signal power 510, resulting in a RX SINR 515. A TX transmit chain transmits at a TX transmit power level 520, leading to a total cancellation gain 525, relative to effective RX noise floor 505. It is noted that the RX signal power may be higher or lower than effective RX noise floor 505. A required SINR level depends upon the MCS level supported, with the lowest MCS levels requiring a very low SINR, which may be negative.

Figures 6A, 6B:
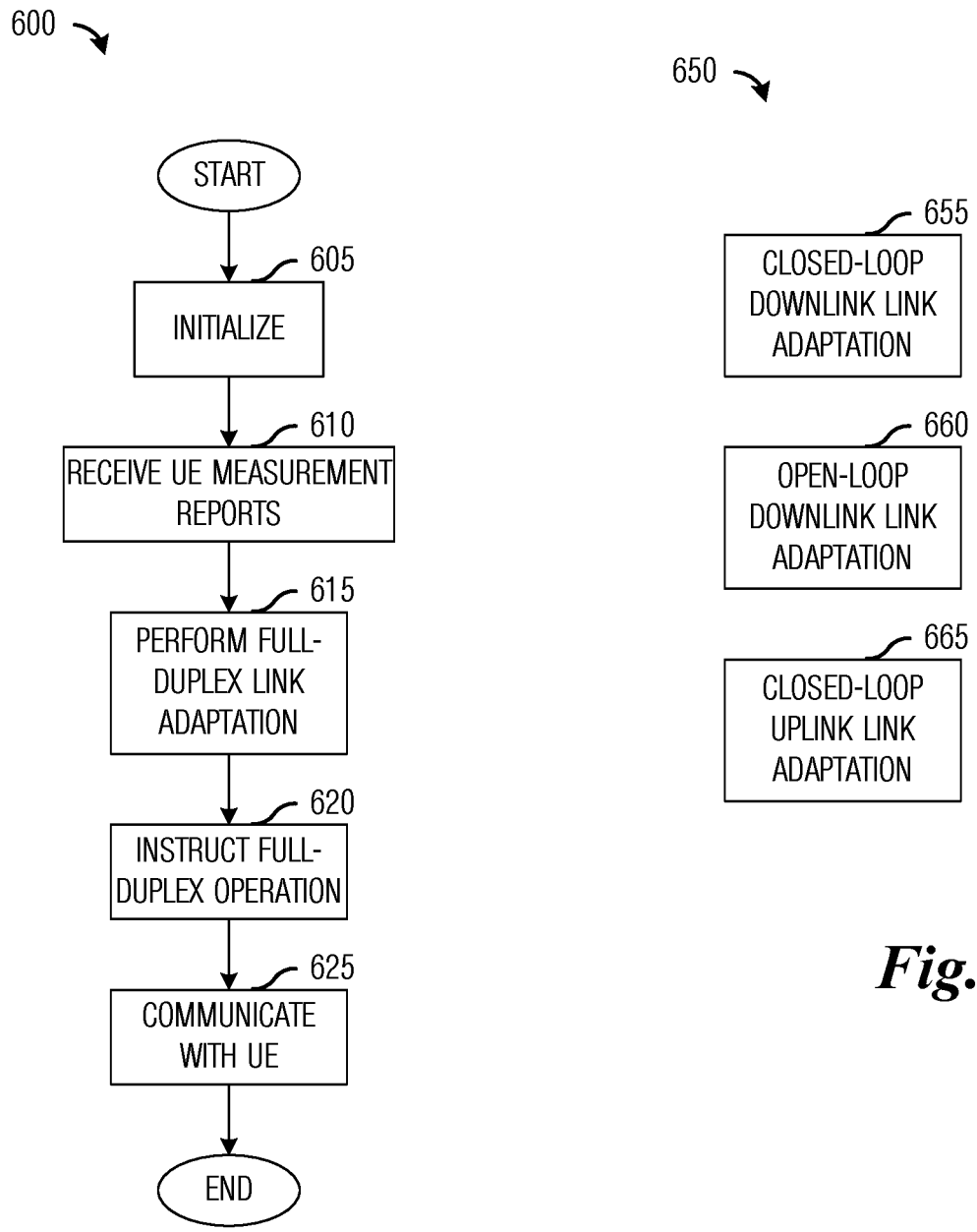
FIG. 6A illustrates a flow diagram of example operations occurring in an eNB participating in FD operations according to example embodiments described herein.
FIG. 6B illustrates example embodiments of FD LA according to example embodiments described herein.

FIG. 6A illustrates a flow diagram of example operations 600 occurring in an eNB participating in FD operations. Operations 600 may be indicative of operations occurring in an eNB of a FD communications system as the eNB participates in FD operations.

Operations 600 may begin with the eNB and a UE initializing (block 605). Initializing may include the eNB and the UE performing link setup, and the eNB receiving a FD capability report from the UE. The FD capability report may be based on current conditions and circumstances, for example, current environmental conditions do not permit the UE to participate in FD operations, the UE is experiencing high interference, which prohibits FD operations, and so on.

The eNB receives measurement reports from the UE (block 610). The measurement reports from the UE may include a channel quality indicator (CQI) measured without self-interference $CQI_{HD}$, i.e., the CQI is measured with the UE not in FD mode. The measurement report may also include a CQI offset that corresponds to a CQI back off value in the downlink when FD operation is active. As an illustrative example, the CQI offset is set to 0 when the UE transmission power level is below the TX power break point. The CQI offset may be estimated in accordance with measurements of a FD downlink reference signal or derived in accordance with the TX transmit power level and a FD self-cancellation gain (CG) table that includes cancellation gains for different FD configuration conditions (such as TX/RX bandwidth, TX power level, beamforming modes, and so forth) at the UE while FD operation is active. The measurement reports are received periodically or after a request from the eNB.

The measurement report may also include one or more power margins. The one or more power margins inform the eNB about how much margin remains in order to retain FD operation. In other words, the one or more power margins inform the eNB how much it is able to adjust FD configuration parameters for links between the eNB and the UE while ensuring that UE can continue FD operation or enable a resumption of FD operation. The one or more power margins inform the eNB about how FD configuration adjustment will impact FD performance and enable eNB to perform some agile open loop link adaptation.

Figure 7:
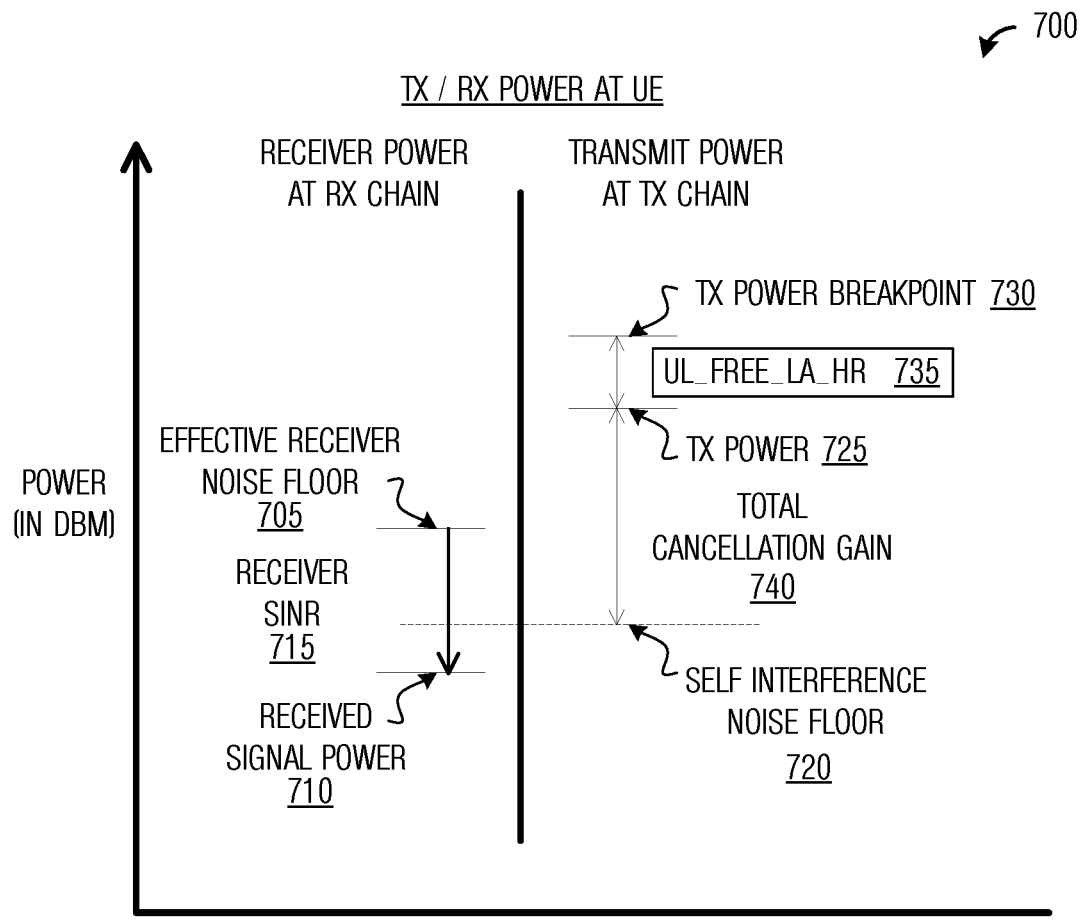
FIG. 7 illustrates a diagram of TX and RX power at a UE highlighting derivation of UL_Free_LA_HR according to example embodiments described herein.

A first power margin UL_Free_LA_HR is a TX power headroom margin and indicates how much power margin is left or needed for the eNB to conduct uplink power control without impacting FD downlink performance. FIG. 7 illustrates a diagram 700 of TX and RX power at a UE highlighting derivation of UL_Free_LA_HR. A RX receive chain has an effective RX noise floor 705 and a received signal power 710, resulting in a RX SINR 715. As shown in FIG. 7, a self-interference noise floor 720 of RX receive chain is much lower than the effective RX noise floor 705, meaning that a TX power level 725 is lower than a TX power break point 730. UL_Free_LA_HR 735 is equal to a difference between TX power break point 730 and TX power level 725. A total cancellation gain 740 is a difference between TX power level 725 and self-interference noise floor 720. Alternatively, the measurement report includes TX power break point 730 instead of UL_Free_LA_HR 735 in a situation when absolute power control is used.

Figure 8:
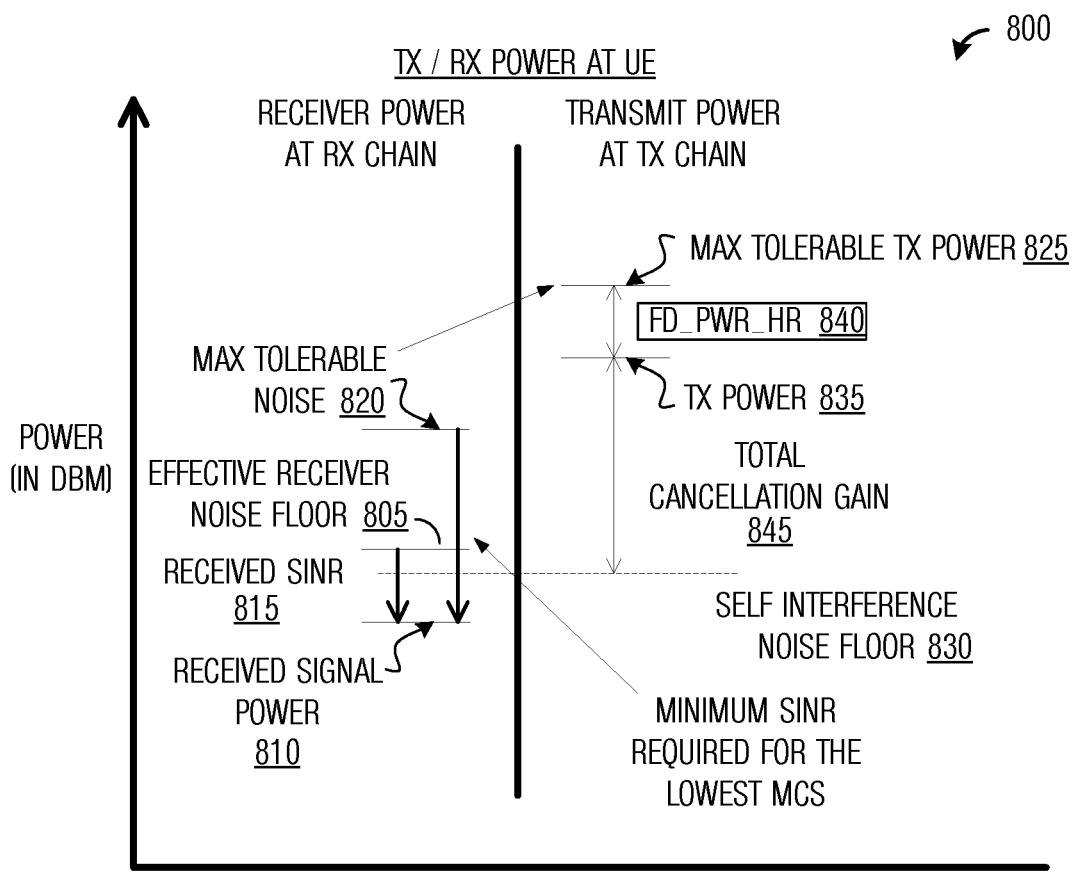
FIG. 8 illustrates a diagram of TX and RX power at a UE highlighting derivation of PD_Pwr_HR according to example embodiments described herein.

A second power margin FD_Pwr_HR is a FD transmission power headroom and indicates how much TX power margin is available for the UE to continue supporting FD operation. FD_Pwr_HR may be limited by a maximum transmission power of the UE. The UE may, based on the RX power level, determine a maximum tolerable noise level (or similarly, a minimum RX SINR) in the downlink that corresponds to the lowest supported MCS level in the downlink. The UE may derive the maximum TX power level permitted while supporting FD operation. FIG. 8 illustrates a diagram 800 of TX and RX power at a UE highlighting derivation of FD_Pwr_HR. A RX receive chain has an effective RX noise floor 805 and a received signal power 810, resulting in a RX SINR 815. The UE also knows a maximum tolerable noise level 820 that supports FD operation, which at a TX transmit chain, translates to a maximum tolerable TX power level 825. Based on a self-interference noise floor 830 and a transmit power level 835, the UE is able to determine a FD_Pwr_HR 840, which is equal to a difference between maximum tolerable TX power level 825 and TX transmit power level 835. A total cancellation gain 845 is a difference between TX power level 835 and self-interference noise floor 830. Alternatively, the measurement report includes maximum tolerable TX power level 825 instead of FD_Pwr_HR 840 in a situation when absolute power control is used.

Referring back now to FIG. 6A, the measurement reports may be received by the eNB in a periodic manner, as configured by the eNB, a technical standard, or an operator of the FD communications system. Alternatively, the eNB may request a measurement report from the UE and the eNB receives the request measurement report. The eNB may store previously received measurement reports and the values included therein. As an illustrative example, the eNB stores the one or more power margins (UL_Free_LA_HR and/or FD_Pwr_HR). The eNB updates its own stored versions of the one or more power margins based on changes that it makes to FD configuration parameters of the links (the uplink and the downlink) between the eNB and the UE. For example, after the eNB issues an uplink power increase to a UE, the eNB needs to adjust the one or more power margins accordingly. When the eNB receives a new measurement report, the eNB may update its own stored versions. The eNB may store separate measurement reports and the values included therein from each UE served by the eNB. The eNB may use measurement reports from one UE for another UE if the UE are in close proximity, have historically similar channel condition, etc.

The eNB performs FD LA for the links between the eNB and the UE (block 615). The FD LA is performed in accordance with the measurement reports, which includes $CQI_{HD}$s, CQI offsets, and one or more power margins (UL_Free_LA_HR and/or FD_Pwr_HR). The FD LA adjusts one or more FD configuration parameters of the links in accordance with the measurement reports. The FD LA adjusts the one or more FD parameters (e.g., MCS level and transmit power level) for either the uplink or the downlink or both the uplink and the downlink in accordance with the measurement reports. Details of different example embodiments of FD LA are provided below.

The eNB instructs FD operation (block 620). The eNB may send indicators of the FD configuration parameters of the links to the UE. As an illustrative example, the FD LA performed by the eNB resulted in changes to the FD configuration parameters of both the uplink and the downlink. The eNB sends indicators of the changed FD configuration parameters or changes to the FD configuration parameters or all of the FD configuration parameters to the UE so that the UE retains its capability to communicate with the eNB. The eNB communicates with the UE using the FD configuration parameters (block 625). The eNB may transmit to the UE over the downlink while receiving from the UE over the uplink.

FIG. 6B illustrates example embodiments of FD LA 650. The example embodiments of FD LA 650 include closed-loop downlink FD LA 655, open-loop downlink FD LA 660, and closed-loop uplink FD LA 665. Detailed discussions of the example embodiments of FD LA 650 are provided below. The example embodiments of FD LA 650 may be implementations of block 615 of FIG. 6A. The example embodiments of FD LA 650 may be implemented separately or in combination with one another. As an illustrative example, closed-loop downlink FD LA 655 is implemented with closed-loop uplink FD LA 665, or open-loop downlink FD LA 660 and closed-loop uplink FD LA 665 are implemented together.

Figure 9:
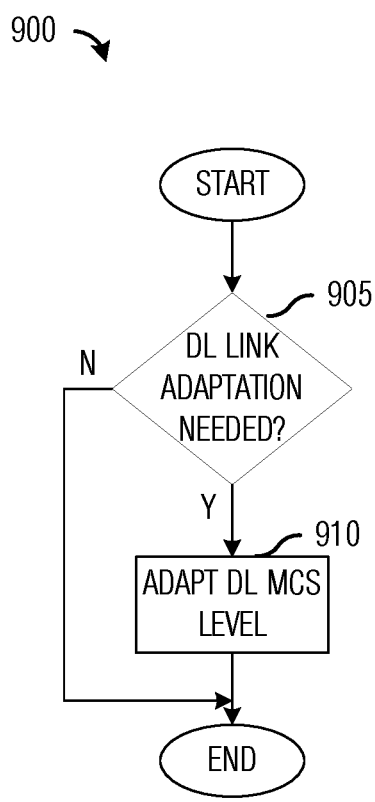
FIG. 9 illustrates a flow diagram of example operations occurring in an eNB participating in closed-loop downlink FD LA according to example embodiments described herein.

FIG. 9 illustrates a flow diagram of example operations 900 occurring in an eNB participating in closed-loop downlink FD LA. Operations 900 may be indicative of operations occurring in an eNB as the eNB participates in closed-loop downlink FD LA. Operations 900 may be an implementation of block 615 of FIG. 6A.

Operations 900 may begin with the eNB checking the measurement report to determine if downlink LA is needed (block 905). The adapting may be performed in accordance with CQI feedback provided by the UE, in a measurement report, for example. If FD operations are enabled, a CQI that includes self-interference (i.e., a CQI measured with self-interference) is used, while if FD operations are not enabled, a CQI that does not include self-interference is used. If downlink LA is needed, the eNB adapts the downlink MCS level (block 910). The adapting of the downlink MCS level may be performed in accordance with the measurement report, which includes $CQI_{HD}$s, CQI offsets, and one or more power margins (UL_Free_LA_HR and/or FD_Pwr_HR).

When FD operations are enabled, a change in FD configuration parameters of the downlink may indicate that a corresponding change in FD configuration parameters of an associated uplink may also be necessary, due to channel reciprocity between uplink and downlink in FD transmission. As an illustrative example, when the TX power level of the UE is higher than the TX power break point, a change in the TX power level in the uplink may impact FD downlink reception, which may lead to further adjustments in the MCS level of the FD downlink. FD downlink performance may be impaired prior to the adjustments. The further adjustments may occur only after the eNB receives a new measurement report from the UE.

Figure 10A:
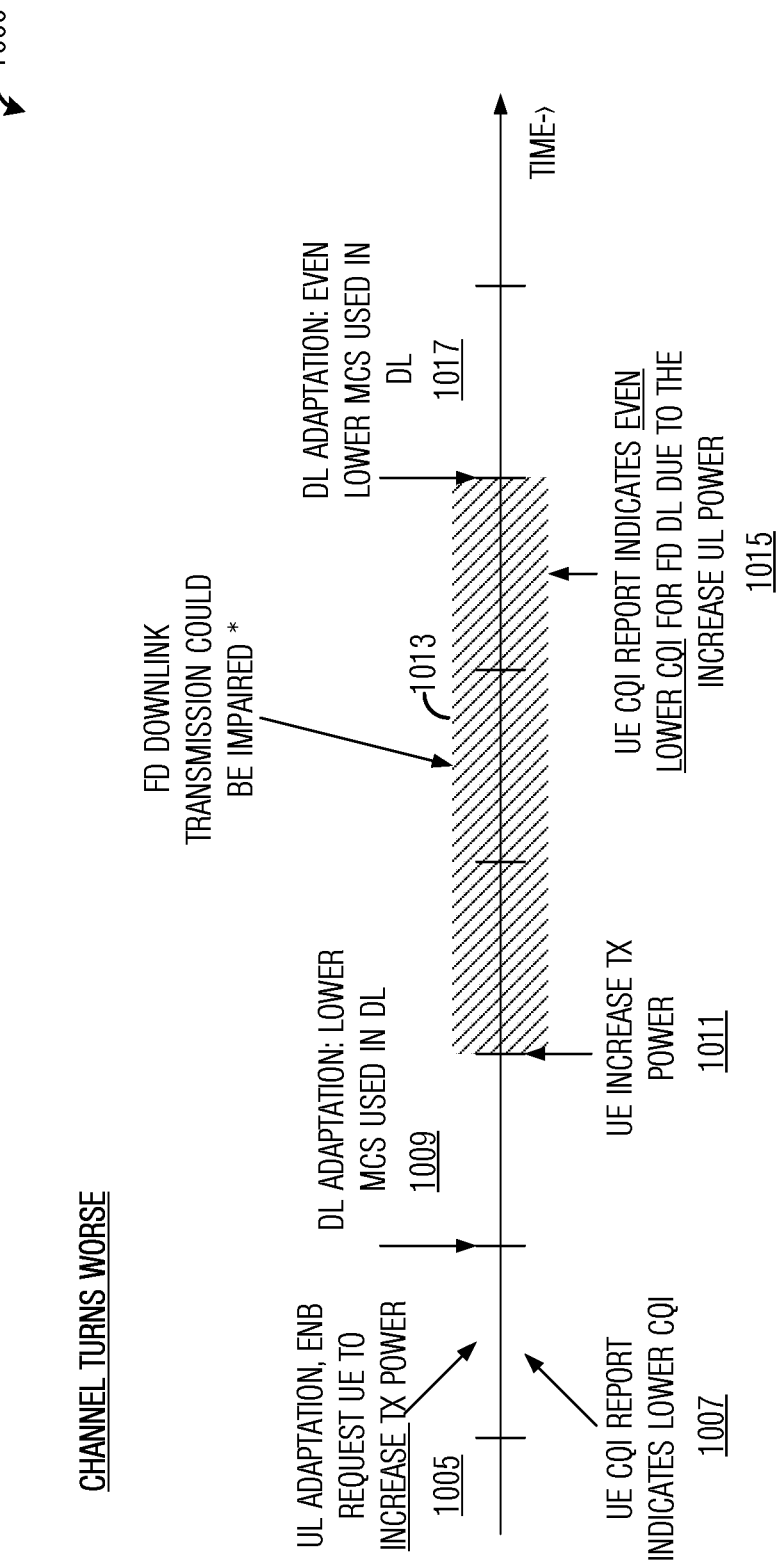
FIG. 10A illustrates a diagram highlighting the operation of closed-loop downlink FD LA as a link quality decreases according to example embodiments described herein.

FIG. 10A illustrates a diagram 1000 highlighting the operation of closed-loop downlink FD LA 900 as a link quality decreases. As shown in FIG. 10A, at a first time instance, an eNB performs uplink FD LA which results in a change in the FD configuration parameters of increasing the transmit power level of the uplink (shown as event 1005). At a second time instance, the eNB receives a UE measurement report indicating a lower CQI (shown as event 1007). As a result of the UE measurement report, when the eNB performs downlink FD LA at a third time instance, a change in the FD configuration parameters of lowering the MCS level of the downlink occurs (shown as event 1009). However, before the eNB updates the UE on the new FD configuration parameters, at a fourth time instance the UE increases the transmit power level of the uplink (shown as event 1011). For discussion purposes, assume that the increase in the transmit power level of the uplink results in a transmit power level that exceeds the TX power break point, which results in potential impairment of FD downlink transmissions during interval 1013. At a fifth time instance, the eNB receives another UE measurement report indicating an even lower CQI due to the increase transmit power level of the uplink (shown as event 1015). At a sixth time instance, the eNB performs downlink FD LA that results in a change in the FD configuration parameters of a further lowering of the MCS level of the downlink (shown as event 1017). The lowering of the MCS level of the downlink is sufficient to enable FD downlink transmission.

Figure 10B:
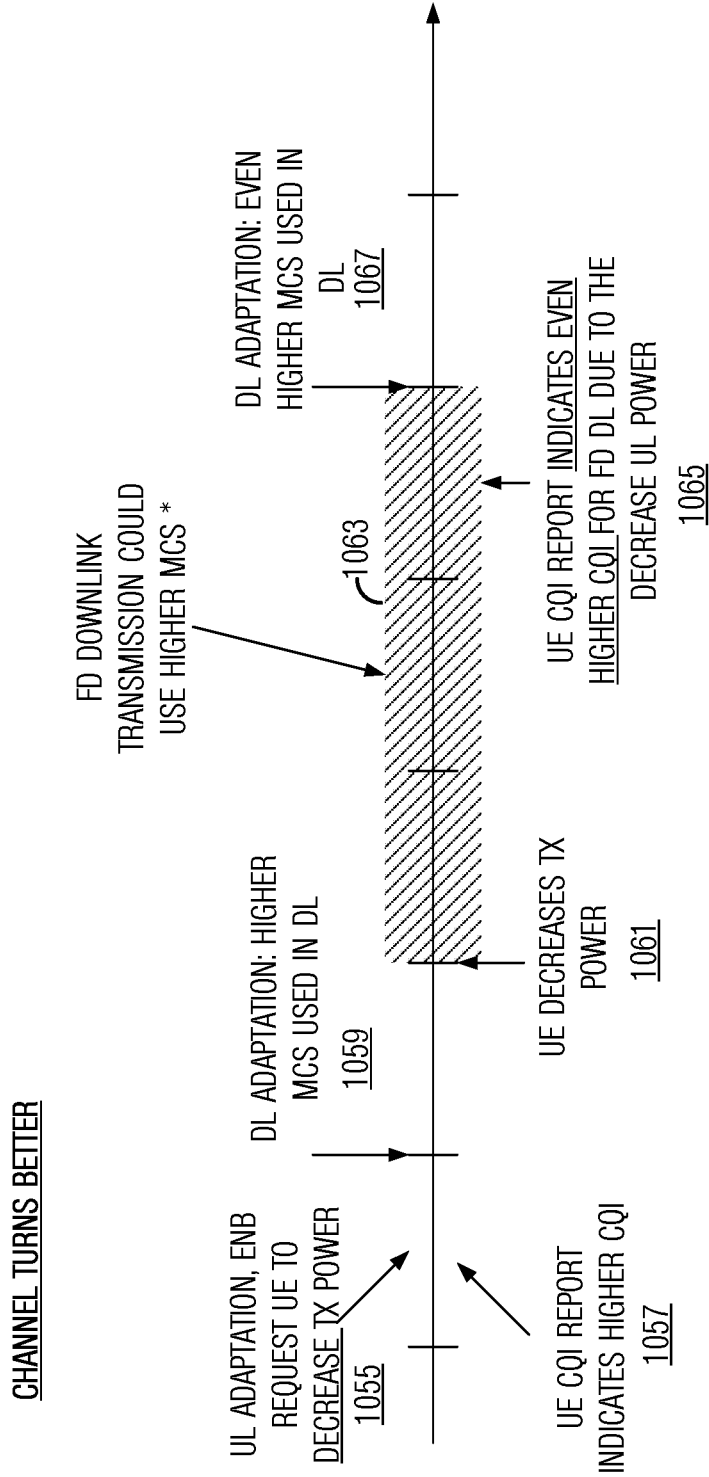
FIG. 10B illustrates a diagram highlighting the operation of closed-loop downlink FD LA as a link quality increases according to example embodiments described herein.

FIG. 10B illustrates a diagram 1050 highlighting the operation of closed-loop downlink FD LA 900 as a link quality increases. As shown in FIG. 10B, at a first time instance, an eNB performs uplink FD LA which results in a change in the FD configuration parameters of decreasing the transmit power level of the uplink (shown as event 1055). At a second time instance, the eNB receives a UE measurement report indicating a higher CQI (shown as event 1057). As a result of the UE measurement report, when the eNB performs downlink FD LA at a third time instance, a change in the FD configuration parameters of increasing the MCS level of the downlink occurs (shown as event 1059). However, before the eNB updates the UE on the new FD configuration parameters, at a fourth time instance the UE decreases the transmit power level of the uplink (shown as event 1061). For discussion purposes, assume that the decrease in the transmit power level of the uplink results in a transmit power level that still exceeds the TX power break point, which results in FD downlink transmissions that may be able to use a higher MCS level during interval 1063. At a fifth time instance, the eNB receives another UE measurement report indicating an even higher CQI due to the increase decreased power level of the uplink (shown as event 1065). At a sixth time instance, the eNB performs downlink FD LA that results in a change in the FD configuration parameters of a further increasing of the MCS level of the downlink (shown as event 1067). The increasing of the MCS level of the downlink is sufficient to enable FD downlink transmission at better MCS levels.

Figures 11A, 11B:
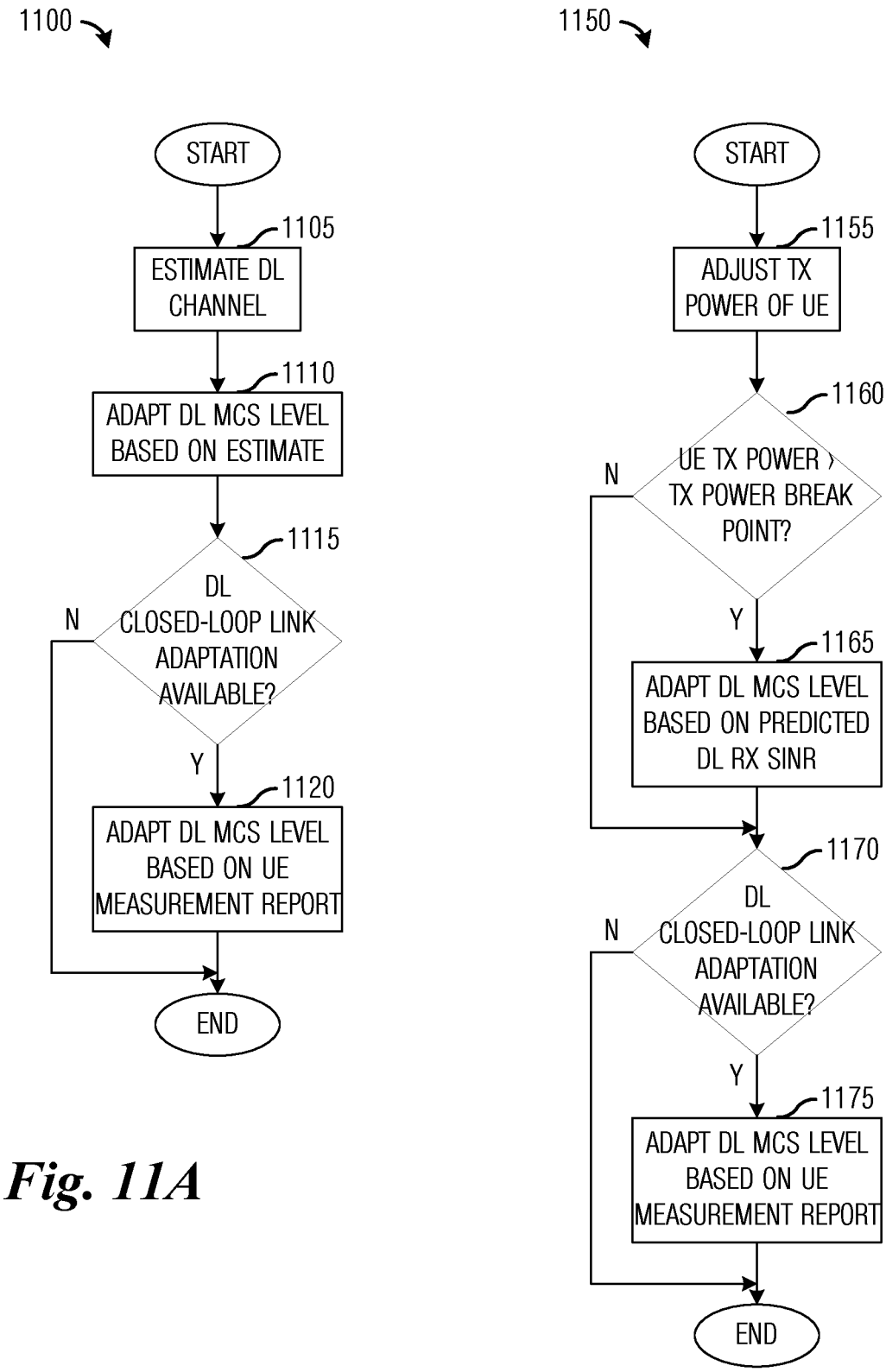
FIG. 11A illustrates a flow diagram of example operations occurring in an eNB participating in open-loop FD LA according to example embodiments described herein.
FIG. 11B illustrates a flow diagram of example operations 1150 occurring in an eNB participating in open-loop FD downlink LA based on UL power control according to example embodiments described herein.

FIG. 11A illustrates a flow diagram of example operations 1100 occurring in an eNB participating in open-loop FD downlink LA. Operations 1100 may be indicative of operations occurring in an eNB as the eNB participates in open-loop FD downlink LA. Operations 1100 may be an implementation of block 615 of FIG. 6A.

Operations 1100 may begin with the eNB estimating the downlink channel (block 1105). The channel of the downlink may be estimated using channel reciprocity between uplink and downlink channels in FD transmissions, for example. Alternatively, the downlink channel may be predicted from FD uplink transmissions. The eNB adapts the MCS level of the downlink in accordance with the estimated downlink channel (block 1110). If closed-loop FD downlink LA is available, eNB may fine-tune the downlink MCS level based on UE CQI report by adapting the FD downlink MCS level. Once closed-loop FD downlink measurement is available (block 1115), the eNB may make use of information from downlink measurement report from the UE to fine-tune or retune the MCS level of the downlink (block 1120). The fine-tuning may be necessary due to variations in the interference environment of the UE, mismatches in the assumption that the mapping between the change of UE RX SINR and UE TX power is linear, and so forth. In general, fine-tuning may involve smaller changes to the MCS level than in the adapting performed in block 1110. The eNB performs a check to determine if uplink closed-loop FD LA is available (block 1115). If uplink closed-loop FD LA is available, the eNB adapts the MCS level of the downlink based on a UE RX SINR derived from the uplink closed-loop FD LA (block 1120).

In FD transmission, UE uplink power adjustment may impact UE downlink performance. A fast open loop downlink LA can also be applied by eNB to agilely track this effect and adapt the link accordingly. FIG. 11B illustrates a flow diagram of example operations 1150 occurring in an eNB participating in open-loop FD downlink LA based on UL power control. Operations 1150 may be indicative of operations occurring in an eNB as the eNB participates in open-loop FD downlink LA based on UL power control.

As an illustrative example, eNB issued a power change to a UE in uplink. Consider a situation wherein the eNB assumes that a UE TX power adjustment dP maps linearly to RX noise power changes dN in the log domain. Then, depending upon operating region, the UE may feedback a coefficient k to the eNB so that dP=k*dN. Additionally, before the eNB receives the UE feedback in the form of a measurement report, for example, the eNB may use a default or prespecified value.

Operations 1150 may begin with the eNB adjusting the TX power level of the UE (block 1155). The eNB may send a power control command to the UE. The eNB may adapt the downlink as needed. Firstly, eNB needs to update power margins base on uplink power change. If the power margin UL_Free_LA_HR is less than 0 (i.e., UE TX power level>TX power break point) (block 1165), the eNB may adapt the downlink MCS level in accordance on a predicted downlink RX SINR (block 1170). If the power margin UL_Free_LA_HR is greater than 0, as long as the adjustment to the UE TX power level is smaller than UL_Free_LA_HR, there will be no impact on downlink FD performance. Therefore, no open-loop FD LA is necessary for such TX power level changes.

As another illustrative example, consider a situation where absolute power control is utilized, then the eNB knows the absolute TX power level of the UE. Therefore, the UE reports the TX power break point to the eNB. If the TX power level of the UE is greater than the TX power break point, the eNB adapts the MCS level of the downlink in accordance with a predicted RX SINR. However, if the TX power level of the UE is less than the TX power break point, as long as the newly adapted TX power level of the UE is remains less than the TX power break point, there is no impact on downlink FD performance. Therefore, no open-loop FD LA is necessary for such TX power level changes.

Once closed-loop FD downlink measurement is available, the eNB may make use of information from downlink measurement report from the UE to fine-tune or retune the MCS level of the downlink. The fine tuning may be necessary due to variations in the interference environment of the UE, mismatches in the assumption that the mapping between the change of UE RX SINR and UE TX power is linear, and so forth. The eNB performs a check to determine if uplink closed-loop FD LA is available (block 1170). If uplink closed-loop FD LA is available, the eNB adapts the MCS level of the downlink based on a UE RX SINR derived from the uplink closed-loop FD LA (block 1175).

Figure 12:
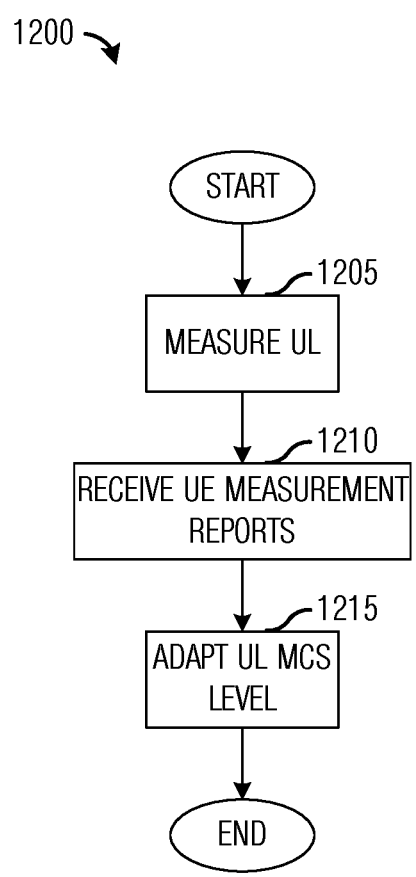
FIG. 12 illustrates a flow diagram of example operations occurring in an eNB participating in closed-loop uplink FD LA according to example embodiments described herein.

FIG. 12 illustrates a flow diagram of example operations 1200 occurring in an eNB participating in closed-loop uplink FD LA. Operations 1200 may be indicative of operations occurring in an eNB as the eNB participates in closed-loop uplink FD LA. Operations 1200 may be an implementation of block 615 of FIG. 6A.

Operations 1200 may begin with the eNB making a local measurement of the uplink (block 1205). The eNB receives a measurement report from the UE (block 1210). The measurement report includes the power margin FD_Pwr_HR. The eNB adapts the MCS level for the uplink in accordance with the local measurement of the uplink and the power margin FD_Pwr_HR (block 1215). As an illustrative example, depending on the amount of power headroom remaining, the eNB adjust the TX power level and the MCS level.

A conservative LA technique may be employed in the FD uplink to avoid a coupling between the FD uplink and the FD downlink. As an illustrative example, the eNB may utilize a periodically reported UL_Free_LA_HR power margin to limit a maximum uplink transmit power adjustment so that an adjusted TX transmit power level remains less than the TX power break point, therefore preventing a negative impact on the RX performance of the UE. As another illustrative example, the UE ignores changes to the TX transmit power level of the uplink that results in the adjusted TX transmit power level that exceeds the TX power break point. Furthermore, the UE reduces the MCS level of the uplink. Alternatively, the UE adjusts its TX power level in the uplink in an open-loop mode in accordance with an estimate of the downlink with a restriction that the adjusted TX power level complies with the UL_Free_LA_HR power margin. After the adjustment to the TX power level, the UE provides feedback to the eNB regarding the change to the TX power level. When open-loop uplink FD LA is utilized, the eNB may not adapt the FD downlink in open-loop mode as described previously. A similar process may be utilized when absolute uplink power control is used.

Figure 13:
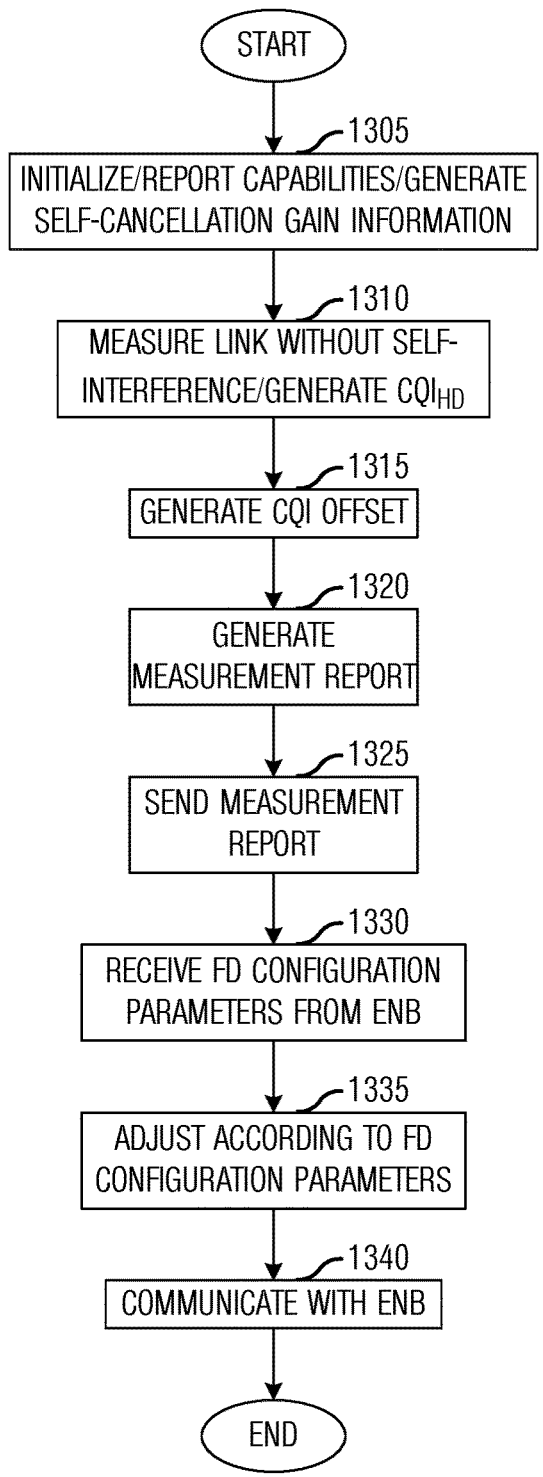
FIG. 13 illustrates a flow diagram of example operations occurring in a UE participating in FD operation according to example embodiments described herein.

FIG. 13 illustrates a flow diagram of example operations 1300 occurring in a UE participating in FD operation. Operations 1300 may be indicative of operations occurring in a UE as the UE participates in FD operation.

Operation 1300 may begin with the UE and the eNB initializing (block 1305). Initializing may include the UE and the eNB performing link setup and the UE sending a FD capability report to the eNB (the FD capability report may be based on current conditions and circumstances). The UE may also generate CG information. The CG information may include cancellation gains for different FD configuration conditions (such as TX/RX bandwidth, TX power level, beamforming modes, and so forth) at the UE while FD operation is active.

The UE measures the link while in HD mode and generates $CQI_{HD}$ (block 1310). In other words, the link is measured while the UE is not transmitting and therefore, without self-interference. The UE determines a CQI offset (block 1315). As an example, the CQI offset is set to 0 when the UE TX power level is less than TX power break point. The CQI offset may be estimated in accordance with a FD downlink reference signal or derived based on the CG information and the TX power level. The UE generates a measurement report (block 1320). The measurement report may include at least one of $CQI_{HD}$, CQI offset, power margin UL_Free_LA_HR, and power margin FD_Pwr_HR. The UE sends the measurement report (block 13225). The measurement report may be sent periodically as configured by the eNB, a technical standard, or an operator of the FD communications system. Alternatively, the measurement report may be sent in response to receiving an instruction or request from the eNB.

The UE receives FD configuration parameters from the eNB (block 1330). The FD configuration parameters may include changes to previous FD configuration parameters for the uplink and/or downlink. The FD configuration parameters may include a subset of current FD configuration parameters as adapted by the eNB, where the subset may include only FD configuration parameters for only those FD configuration parameters that have changed or the subset may include all of the FD configuration parameters. The UE adjusts the FD configuration of the uplink and/or downlink in accordance with the FD configuration parameters (block 1335). The UE may operate in a conservative manner by checking to determine if the FD configuration parameters will cause it to perform worse and if the FD configuration parameters will result in worse performance, the UE may ignore the FD configuration parameters. As an illustrative example, consider a situation wherein the UE receives an instruction from the eNB to increase the TX power level. However, the transmit power level of the UE is already at or near the TX power break point and the adjusted TX power level would exceed the TX power break point. The UE may simply ignore the instruction since the UE usually does not want to exceed the TX power break point. The UE communicates with the eNB (block 1340).

FD operation should be disabled if the adjustment to the TX power level results in the TX power level exceeding the FD_Pwr_HR for the lowest supported MCS level in the downlink. A remedy is to disable FD operation at the UE. FD operations should also be disabled if the minimum RX power for the lowest supported MCS level in the uplink cannot be met at the eNB. A remedy is to disable FD operation at the eNB.

The eNB may coordinate FD downlink and uplink LA to maintain FD operation at both the eNB and the UE. As an illustrative example, the eNB may limit the TX power level in the uplink to enable FD operation at the UE. However, the enabling of FD operation may depend on spectral efficiency of FD operation as compared to HD operation.

Figure 14:
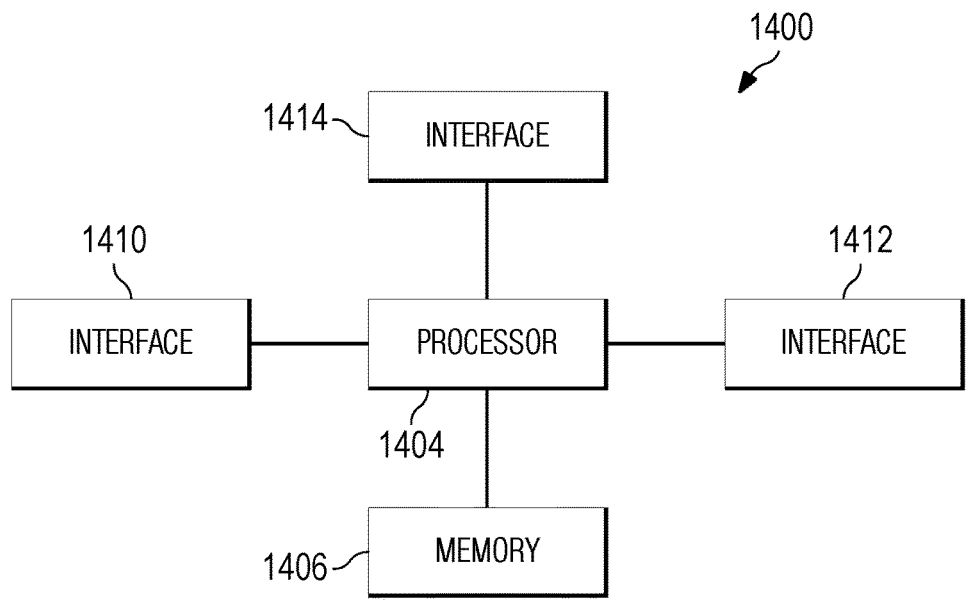
FIG. 14 illustrates a block diagram of an embodiment processing system for performing methods described herein.

FIG. 14 illustrates a block diagram of an embodiment processing system 1400 for performing methods described herein, which may be installed in a host device. As shown, the processing system 1400 includes a processor 1404, a memory 1406, and interfaces 1410-1414, which may (or may not) be arranged as shown in FIG. 14. The processor 1404 may be any component or collection of components adapted to perform computations and/or other processing related tasks, and the memory 1406 may be any component or collection of components adapted to store programming and/or instructions for execution by the processor 1404. In an embodiment, the memory 1406 includes a non-transitory computer readable medium. The interfaces 1410, 1412, 1414 may be any component or collection of components that allow the processing system 1400 to communicate with other devices/components and/or a user. For example, one or more of the interfaces 1410, 1412, 1414 may be adapted to communicate data, control, or management messages from the processor 1404 to applications installed on the host device and/or a remote device. As another example, one or more of the interfaces 1410, 1412, 1414 may be adapted to allow a user or user device (e.g., personal computer (PC), etc.) to interact/communicate with the processing system 1400. The processing system 1400 may include additional components not depicted in FIG. 14, such as long term storage (e.g., non-volatile memory, etc.).

In some embodiments, the processing system 1400 is included in a network device that is accessing, or part otherwise of, a telecommunications network. In one example, the processing system 1400 is in a network-side device in a wireless or wireline telecommunications network, such as a base station, a relay station, a scheduler, a controller, a gateway, a router, an applications server, or any other device in the telecommunications network. In other embodiments, the processing system 1400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 15:
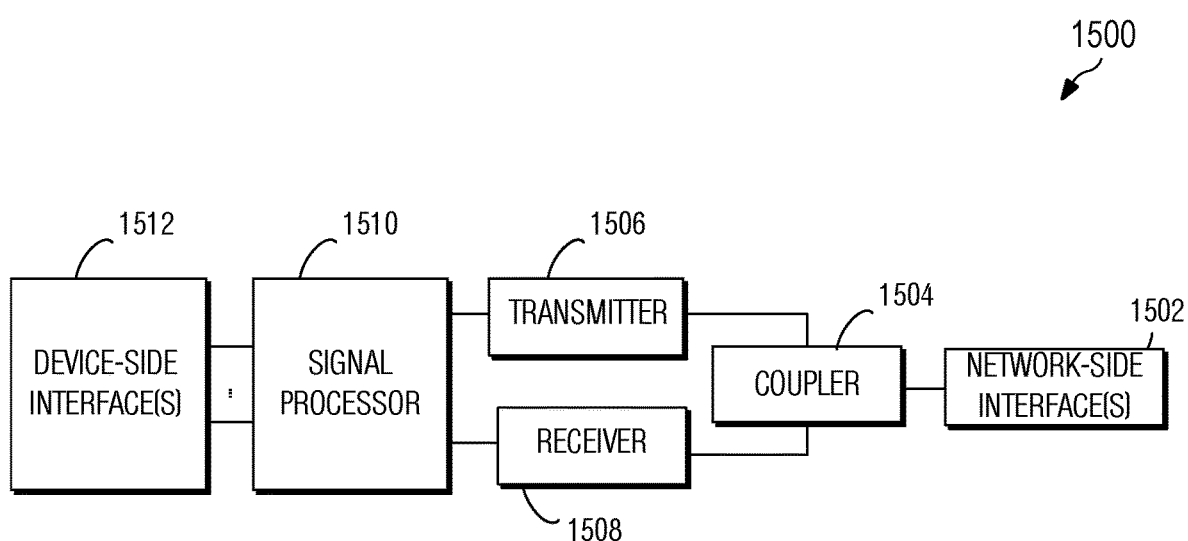
FIG. 15 illustrates a block diagram of a transceiver adapted to transmit and receive signaling over a telecommunications network.

In some embodiments, one or more of the interfaces 1410, 1412, 1414 connects the processing system 1400 to a transceiver adapted to transmit and receive signaling over the telecommunications network. FIG. 15 illustrates a block diagram of a transceiver 1500 adapted to transmit and receive signaling over a telecommunications network. The transceiver 1500 may be installed in a host device. As shown, the transceiver 1500 comprises a network-side interface 1502, a coupler 1504, a transmitter 1506, a receiver 1508, a signal processor 1510, and a device-side interface 1512. The network-side interface 1502 may include any component or collection of components adapted to transmit or receive signaling over a wireless or wireline telecommunications network. The coupler 1504 may include any component or collection of components adapted to facilitate bi-directional communication over the network-side interface 1502. The transmitter 1506 may include any component or collection of components (e.g., up-converter, power amplifier, etc.) adapted to convert a baseband signal into a modulated carrier signal suitable for transmission over the network-side interface 1502. The receiver 1508 may include any component or collection of components (e.g., down-converter, low noise amplifier, etc.) adapted to convert a carrier signal received over the network-side interface 1502 into a baseband signal. The signal processor 1510 may include any component or collection of components adapted to convert a baseband signal into a data signal suitable for communication over the device-side interface(s) 1512, or vice-versa. The device-side interface(s) 1512 may include any component or collection of components adapted to communicate data-signals between the signal processor 1510 and components within the host device (e.g., the processing system 600, local area network (LAN) ports, etc.).

The transceiver 1500 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1502 comprises one or more antenna/radiating elements. For example, the network-side interface 1502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for operating a communications controller adapted for full duplex (FD) operation, the method comprising:
   estimating, by the communications controller, a downlink channel between the communications controller and a user equipment (UE);
   adapting, by the communications controller, a downlink modulation and coding scheme (MCS) level of a FD link in accordance with the estimated downlink channel;
   communicating, by the communications controller, with the UE over the FD link; and
   determining, by the communications controller, that closed-loop FD downlink link adaptation (LA) is available, and based thereon, tuning the downlink MCS level of the FD link in accordance with a channel quality indicator (CQI) report received from the UE.

2. The method of claim 1, wherein estimating the downlink channel comprises estimating the downlink channel using channel reciprocity and FD uplink channel estimates.

3. The method of claim 1, wherein estimating the downlink channel comprises estimating the downlink channel in accordance with FD uplink transmissions.

4. The method of claim 1, wherein tuning the downlink MCS level comprises adapting the downlink MCS level of the FD link in accordance with the CQI report.

5. The method of claim 1, wherein the CQI report is received periodically.

6. The method of claim 1, further comprising sending, by the communications controller, a request for the CQI report.

7. The method of claim 1, wherein the CQI report comprises at least one of a CQI measured without self-interference, or a CQI offset corresponding to a CQI back off value in the downlink channel when FD operation is active.

8. A communications controller configured for full duplex (FD) operation, the communications controller comprising:
   a memory storage comprising instructions; and
   one or more processors in communication with the memory storage, wherein the one or more processors execute the instructions to:
      estimate a downlink channel between the communications controller and a user equipment (UE),
      adapt a downlink modulation and coding scheme (MCS) level of a FD link in accordance with the estimated downlink channel,
      communicate with the UE over the FD link, and
      determine that closed-loop FD downlink link adaptation (LA) is available, and based thereon, tuning the downlink MCS level of the FD link in accordance with a channel quality indicator (CQI) report received from the UE.

9. The communications controller of claim 8, wherein the one or more processors execute the instructions to estimate the downlink channel using channel reciprocity and FD uplink channel estimates.

10. The communications controller of claim 8, wherein the one or more processors execute the instructions to estimate the downlink channel in accordance with FD uplink transmissions.

11. The communications controller of claim 8, wherein the one or more processors execute the instructions to adapt the downlink MCS level of the FD link in accordance with the CQI report.

12. The communications controller of claim 8, wherein the one or more processors execute the instructions to send a request for the CQI report.

13. The communications controller of claim 8, wherein the CQI report is received periodically.

14. The communications controller of claim 8, wherein the CQI report comprises at least one of a CQI measured without self-interference, or a CQI offset corresponding to a CQI back off value in the downlink channel when FD operation is active.

\* \* \* \* \*